United States Patent
Blanchette et al.

(10) Patent No.: US 7,143,778 B2
(45) Date of Patent: Dec. 5, 2006

(54) CHEMICAL FEEDER

(75) Inventors: David W. Blanchette, Southington, CT (US); Christopher M. Zetena, Atlanta, GA (US); Michael Paloian, Cold Spring Harbor, NY (US); Anthony R. Orchard, Wantagh, NY (US)

(73) Assignee: Arch Chemicals, Inc., Cheshire, CT (US)

( * ) Notice: Subject to any disclaimer, the term of this patent is extended or adjusted under 35 U.S.C. 154(b) by 89 days.

(21) Appl. No.: 11/040,511

(22) Filed: Jan. 21, 2005

(65) Prior Publication Data

US 2005/0145277 A1 Jul. 7, 2005

Related U.S. Application Data

(63) Continuation-in-part of application No. 10/307,671, filed on Dec. 2, 2002, now Pat. No. 6,915,811.

(60) Provisional application No. 60/392,727, filed on Jun. 27, 2002, provisional application No. 60/338,386, filed on Dec. 4, 2001.

(51) Int. Cl.
*B01D 11/02* (2006.01)
(52) U.S. Cl. .................. 137/268; 422/264; 422/277
(58) Field of Classification Search ................ 137/268; 422/264, 277, 266, 276; 210/169, 198.1
See application file for complete search history.

(56) References Cited

U.S. PATENT DOCUMENTS

| | | | |
|---|---|---|---|
| 4,208,376 A | 6/1980 | Casberg | 422/261 |
| 4,250,911 A * | 2/1981 | Kratz | 137/268 |
| D297,857 S | 9/1988 | Alexander et al. | D23/207 |
| 4,917,868 A | 4/1990 | Alexander et al. | 422/119 |
| D309,493 S | 7/1990 | Casberg | D23/208 |
| 4,964,185 A * | 10/1990 | Lehn | 137/268 |
| 5,004,549 A | 4/1991 | Wood et al. | 210/699 |
| RE33,861 E | 3/1992 | Zetena et al. | 137/268 |
| 5,112,521 A | 5/1992 | Mullins et al. | 252/180 |
| 5,133,381 A | 7/1992 | Wood et al. | 137/268 |
| 5,384,102 A | 1/1995 | Ferguson et al. | 422/264 |
| 5,419,355 A | 5/1995 | Brennan et al. | 137/1 |
| 5,427,748 A | 6/1995 | Wiedrich et al. | 422/264 |
| 5,441,711 A | 8/1995 | Drewery | 422/264 |
| 5,536,479 A | 7/1996 | Miller et al. | 422/261 |
| 5,713,384 A * | 2/1998 | Roach et al. | 137/268 |
| 5,759,501 A * | 6/1998 | Livingston et al. | 422/266 |
| 5,765,945 A | 6/1998 | Palmer | 366/167.1 |
| 5,810,043 A | 9/1998 | Grenier | 137/268 |
| 5,928,608 A | 7/1999 | Levesque et al. | 422/37 |
| 5,932,093 A | 8/1999 | Chulick | 210/169 |
| 6,045,706 A | 4/2000 | Morrison et al. | 210/696 |

* cited by examiner

*Primary Examiner*—Kevin Lee
(74) *Attorney, Agent, or Firm*—Todd E. Garabedian; Wiggin and Dana LLP (57) ABSTRACT

A feeder device for introducing treatment chemicals into a recirculating water stream from a swimming pool. The feeder device includes a housing having a top and bottom portions. A funnel-like hopper having sidewalls and an open bottom forms the inside of the top portion. A grid at least partially closes the open bottom of the hopper. The grid includes a top surface and a bottom surface. One or more chemicals such as chlorine are contained within the sidewalls of the hopper and supported by the top surface of the grid. A dissolving cup having a bottom surface and sidewalls is positioned within the bottom portion. The sidewalls include an opening or notch of a predetermined cross-sectional area formed therein. The bottom surface includes a center nozzle oriented vertically toward the bottom surface of the grid and an off-center nozzle adapted to direct the fluid horizontally in the dissolving cup.

22 Claims, 6 Drawing Sheets

CHEMICAL FEEDER

CROSS-REFERENCE TO RELATED APPLICATIONS

This patent application is a continuation-in-part of U.S. Provisional Patent Application Ser. No. 60/338,386 entitled "Chemical Feeder" that was filed on Dec. 4, 2001; U.S. Provisional Patent Application Ser. No. 60/392,727 entitled "Chemical Feeder" that was filed on Jun. 27, 2002; and U.S. Nonprovisional patent application Ser. No. 10/307,671 entitled "Chemical Feeder" that was filed on Dec. 2, 2002 now U.S. Pat. No. 6,915,811. The disclosures of the U.S. Provisional Applications and the U.S. Nonprovisional Application are herein incorporated by reference in their entirety.

BACKGROUND OF THE INVENTION (1) Field of the Invention

The present invention generally relates to water treatment. In particular, the present invention is directed to feeders for introducing treatment chemicals into a recirculating water stream from a swimming pool or the like.

(2) Description of the Related Art

If untreated, swimming pool water provides a hospitable forum for the growth of bacteria, algae, and other undesirable and potentially unhealthful organisms. It, accordingly, has become common practice to treat pool water on both periodic and continuous bases with treatment chemicals to kill/control such organisms.

Such treatment is typically undertaken via the introduction of chlorine into the pool water at levels effective to kill or control the unwanted organisms. The chlorine source may be in liquid form or may be in a solid form which is then dissolved in the pool water. Among solid sources of chlorine are calcium hypochlorite (cal hypo), dichloroisocyanuric acid (dichlor), and trichloroisocyanuric acid (trichlor).

A variety of feeders exist to deliver chlorine from solid chemical tablets and the like. It is known to utilize a floating erosion dispenser, also known as a "floater" or "feeder;" to provide a continuous release of the chemical. The floater contains the solid chemical and provides a controlled exposure of the chemical to the pool water which in turn controls the speed with which the water erodes the solid chemical to introduce chlorine to the pool water. Exemplary floaters are disclosed in U.S. Pat. No. 4,917,868 and U.S. Design Pat. Nos. 297,857 and 309,493. It is also known to pump pool water through an external feeder which may be incorporated in a circulation system that also provides filtering of the pool water. Among such systems are intermittent spray systems, erosion systems, and partial periodic immersion systems. Examples of such systems are shown in U.S. Pat. Nos. 5,932,093, 5,928,608, 5,441,711, 5,427,748, 5,419,355, 5,384,102, 5,133,381, and 4,208,376, and U.S. Reissue Pat. No. 33,861. As additional background, U.S. Pat. Nos. 5,112,521 and 5,004,549 disclose various solid calcium hypochlorite compositions.

Obtaining proper dissolution of the treatment chemical and avoiding undesirable deposits or residues have posed problems in feeder design. Particular problems exist with the use of commercial calcium hypochlorite pellets which produce calcium carbonate deposits. See e.g., U.S. Pat. No. 6,045,706.

BRIEF SUMMARY OF THE INVENTION

One aspect of the present invention is a feeder device for introducing one or more chemicals to a fluid comprising a housing having an inlet through which the fluid flows into the feeder device at an inlet flow rate and an outlet through which the fluid flows out of the feeder device at an outlet flow rate, a hopper having sidewalls and at least an open bottom, said hopper defining a top portion of said housing, a grid at least partially closing said open bottom, said grid having a top surface and a bottom surface, said grid and said hopper adapted to hold the one or more chemicals so that the one or more chemicals are supported by said top surface and are contained by said hopper sidewalls, a dissolving cup at least partially containing said hopper and said bottom surface of said grid, said dissolving cup having a bottom surface and sidewalls joined thereto, said sidewalls extending upwardly above said top surface of said grid, said bottom surface including a center nozzle in fluid communication with said inlet and oriented vertically toward said grid, said bottom surface positioned a predetermined distance from said top surface of said grid, said sidewalls having an opening formed therein, said opening having a predetermined cross-sectional area, a spout fluidly connected with said opening, said spout defining a horizontal channel having channel walls and a channel floor, said channel floor positioned a predetermined distance above said bottom surface of said dissolving cup, and an outlet chamber in fluid communication with said spout and said outlet, said outlet chamber defining a bottom portion of said housing.

Another aspect of the present invention is a feeder device for introducing one or more chemicals to a fluid comprising a housing having an inlet through which the fluid flows into the feeder device at an inlet flow rate and an outlet through which the fluid flows out of the feeder device at an outlet flow rate, a hopper having sidewalls and at least an open bottom, said hopper defining a top portion of said housing, a grid at least partially closing said open bottom, said grid having a top surface and a bottom surface, said grid and said hopper adapted to hold the one or more chemicals so that the one or more chemicals are supported by said top surface and are contained by said hopper sidewalls, a dissolving cup at least partially containing said hopper and said bottom surface of said grid, said dissolving cup having a bottom surface and sidewalls joined thereto, said sidewalls extending upwardly above said top surface of said grid, said bottom surface including a center nozzle in fluid communication with said inlet and oriented vertically toward said grid, said bottom surface positioned a predetermined distance from said top surface of said grid, said sidewalls having an opening formed therein, said opening having a predetermined cross-sectional area, wherein said dissolving cup is adapted to at least temporarily contain the fluid and said inlet flow rate is selected so as to create a raised-center wave portion within the fluid contained by said dissolving cup, a portion of said raised-center wave portion entering a said hopper at least at said top surface of said grid, said portion of said raised-center wave portion being defined by a circular cross-sectional area and a height, said circular cross-sectional area having a diameter, said diameter and said height both varying according to said inlet flow rate, a spout fluidly connected with said opening, said spout defining a horizontal channel having channel walls and a channel floor, said channel floor positioned a predetermined distance above said bottom surface of said dissolving cup, and an outlet chamber joined with said hopper and in fluid communication with said spout and said outlet, said outlet chamber defining a bottom portion of said housing.

Yet another aspect of the present invention is a method of introducing one or more chemicals to a fluid comprising the steps of providing a feeder device according to the feeder device described above, introducing fluid to the feeder device at an inlet flow rate, bringing a portion of the fluid in contact with a portion of the one or more chemicals, said portion of the fluid defined by a circular cross-sectional area and a height, said circular cross-sectional area having a diameter, and varying said diameter and said height according to said inlet flow rate.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
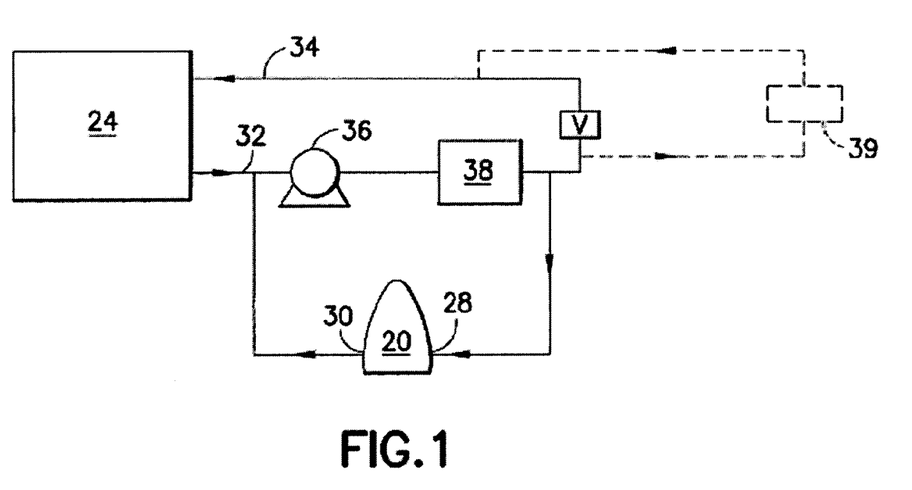
FIG. 1 is a simplified schematic of an exemplary chemical feed system including a feeder device according to one embodiment of the present invention.

Referring now to the drawings in which like reference numerals indicate like parts, and in particular to FIG. 1, the present invention is a feeder device 20 for use in a recirculation system 22, which circulates water 24 from a pool 26 through the feeder device. Feeder device 20 typically introduces a chemical solution including chlorine and or other chemicals to water 24 flowing through recirculation system 22. Within recirculation system 22, water 24 enters an inlet 28 of feeder device 20 and exits an outlet 30. Recirculation system 22 generally includes a pool outlet conduit 32 drawing water from pool 26 and a pool return conduit 34 returning water to the pool. Flow through these conduits is induced by a pump 36 with a low pressure (suction) side toward pool outlet conduit 32 and a high pressure side toward pool return conduit 34. Downstream of pump 36, there may be a system filter 38 filtering debris and the like from water flowing from the pump. Because flow out of outlet 30 of feeder device 20 requires a vacuum to draw the chemical solution from the feeder device, if feeder device 20 is positioned below the water level of pool 26, an optional venturi system 39 (see dashed lines) may be installed downstream of the feeder device outlet to pull the chemical solution from the feeder device. If venturi system 39 is used, a valve V, e.g., ball or gate valve, is positioned in front of the venturing system in a partially closed state to create a pressure differential so that fluid is forced through the venturi system loop.

Figure 2:
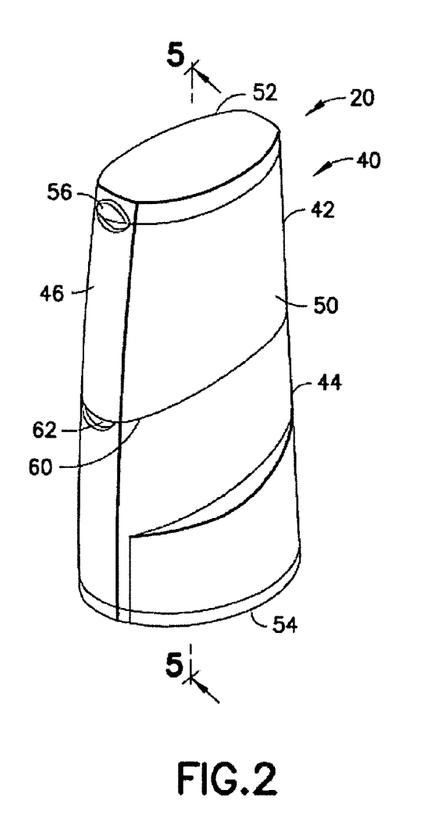
FIG. 2 is a front isometric view of a feeder device according to one embodiment of the present invention.
Figure 3:
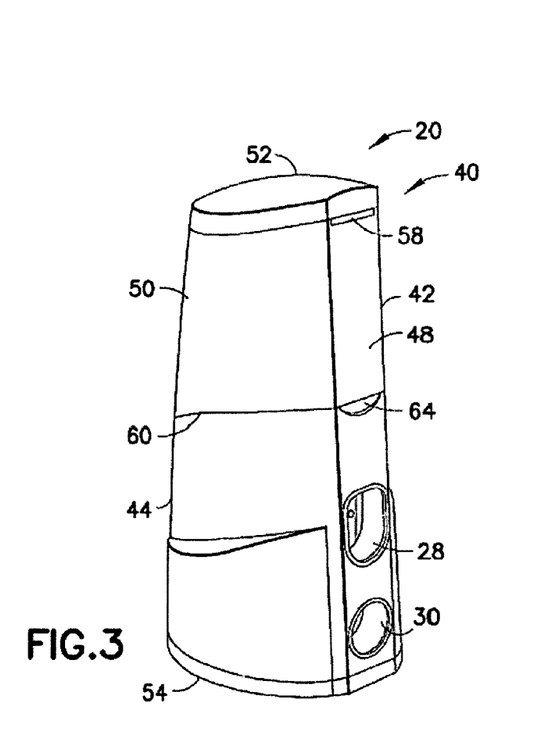
FIG. 3 is a back isometric view of the feeder device in FIG. 2.
Figure 4:
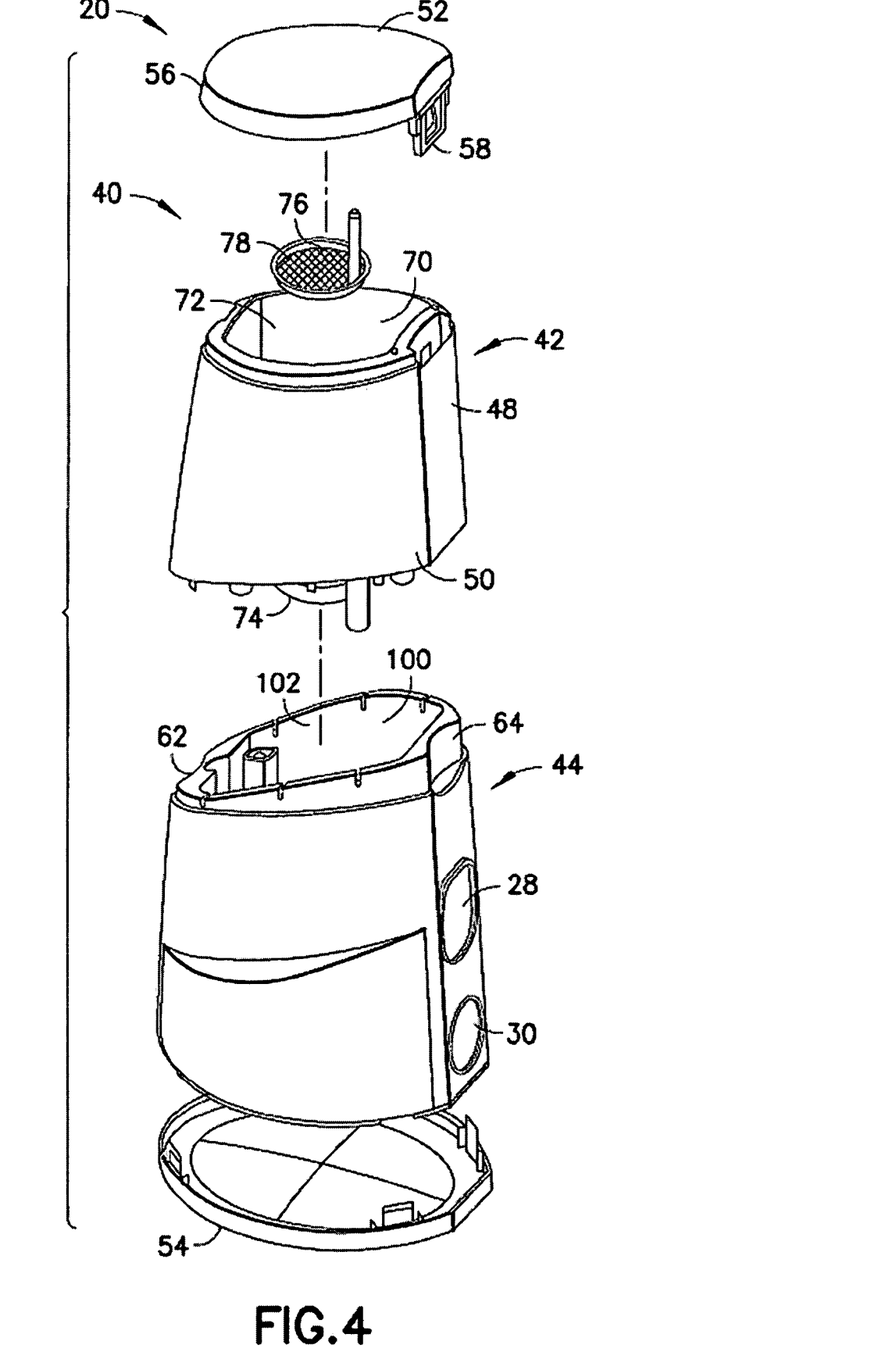
FIG. 4 is an exploded view of the feeder device in FIGS. 2 and 3.

FIGS. 2–4 illustrate one embodiment of feeder device 20 of the present invention. Feeder device 20 is defined by a substantially cylindrical housing 40 having a top portion 42 and a bottom portion 44. Top and bottom portions 42 and 44 are joined to define a front surface 46, a rear surface 48, a right side surface 50, and a mirror image left side surface (not shown). In addition, top portion 42 includes a removable lid 52 and bottom portion 44 includes a bottom 54. Although housing 40 is illustrated as having a substantially oval or elliptical cross-sectional shape, as one skilled in the art will appreciate, myriad alternative cross-sectional shapes are acceptable. In one embodiment, all of the elements of feeder device 20 are formed from a plastic material. Of course, any materials suitable for use with swimming pool water and swimming pool water treatment chemicals may be used.

Lid 52 includes a handle portion 56 and a hinge portion 58. When joined to top portion 42, handle portion 56 is positioned on front surface 46 and hinge portion 58 is positioned on rear surface 48. A circumferential seam 60 is defined where top portion 42 and bottom portion 44 are joined. A front recess 62 is defined in bottom portion 44 along front surface 46 at seam 60 and a rear recess 64 is defined in bottom portion 44 along rear surface 48 at the seam. As best illustrated in FIG. 4, front and rear recesses 62 and 64, respectively, facilitate separation of top and bottom portions 42 and 44, respectively. Inlet 28 and outlet 30 are defined in bottom portion 44 along rear surface 48. Fluid flows into feeder device 20 via inlet 28 at an inlet flow rate and out of the feeder device via outlet 30 at an outlet flow rate.

Figure 5:
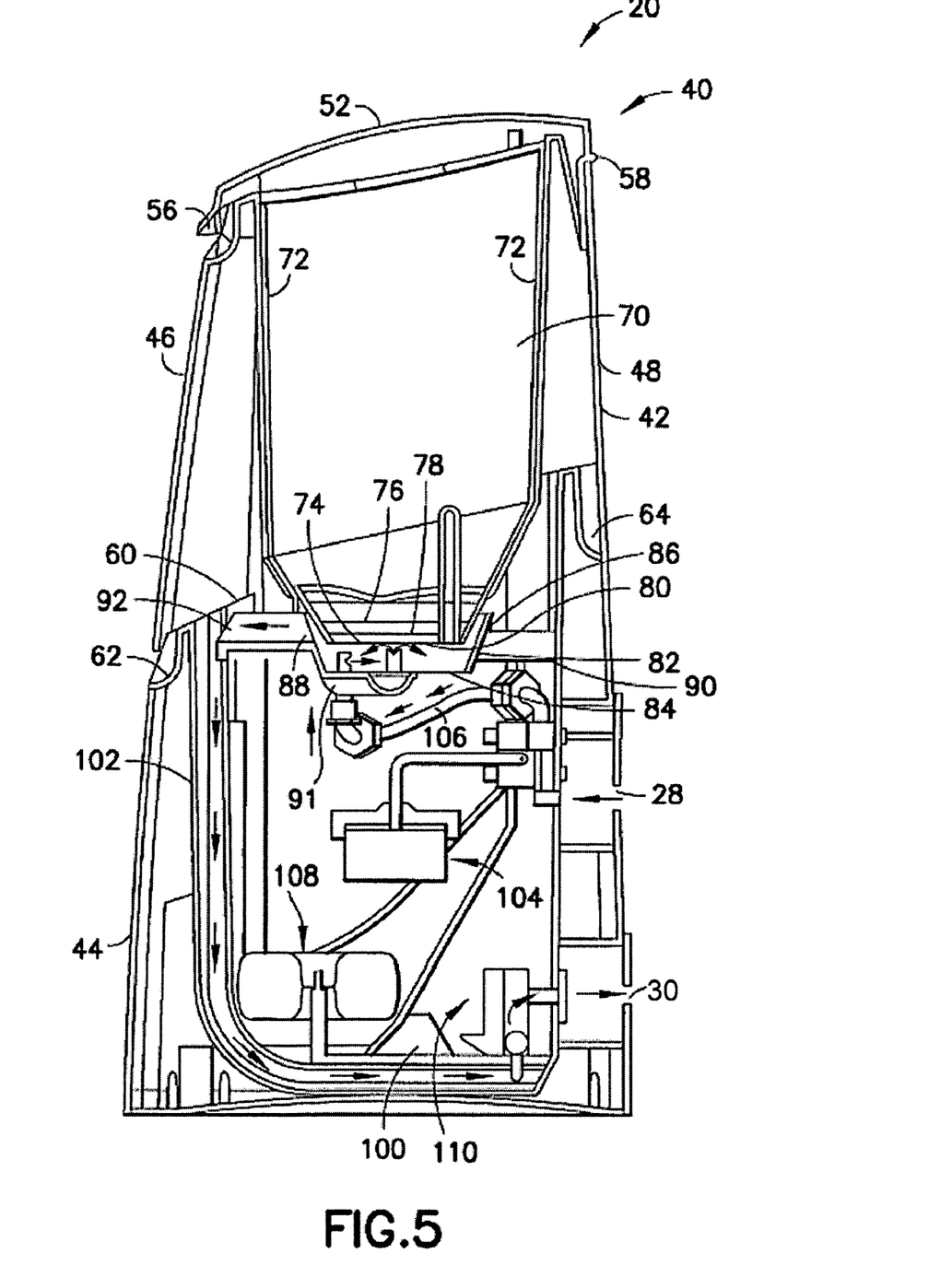
FIG. 5 is a cross-section of the feeder device taken along line 5—5 of FIG. 2.
Figure 6:
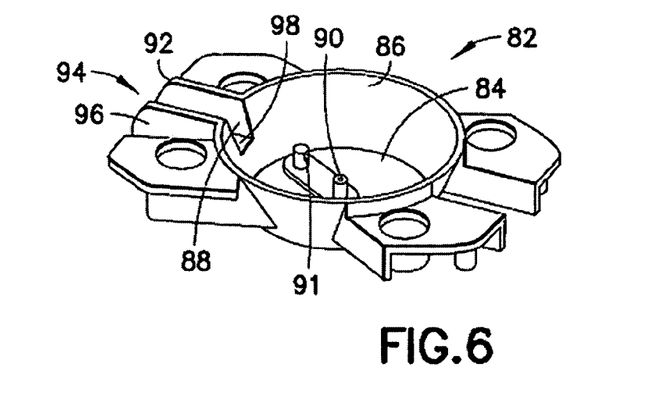
FIG. 6 is a top isometric view of a dissolving cup according to one embodiment of the present invention.
Figure 7:
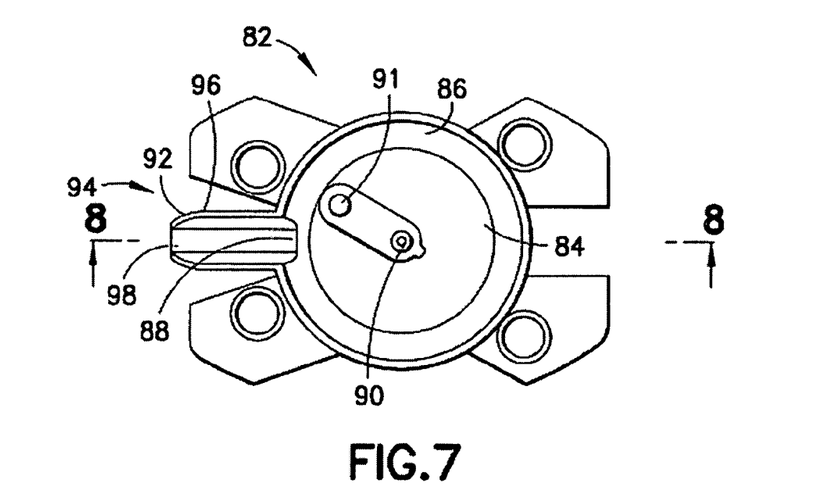
FIG. 7 is a top view of the dissolving cup of FIG. 6.
Figure 8:
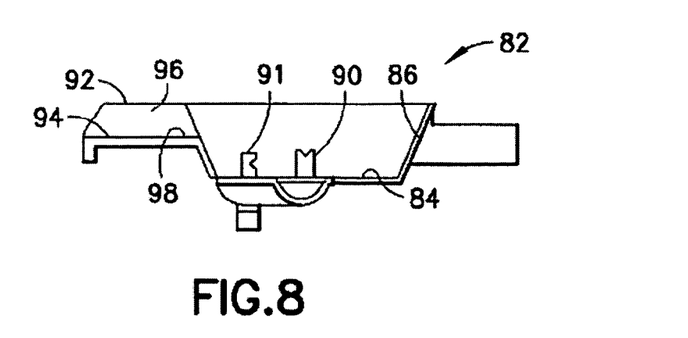
FIG. 8 is a cross-section of the dissolving cup taken along line 8—8 of FIG. 7.
Figure 9:
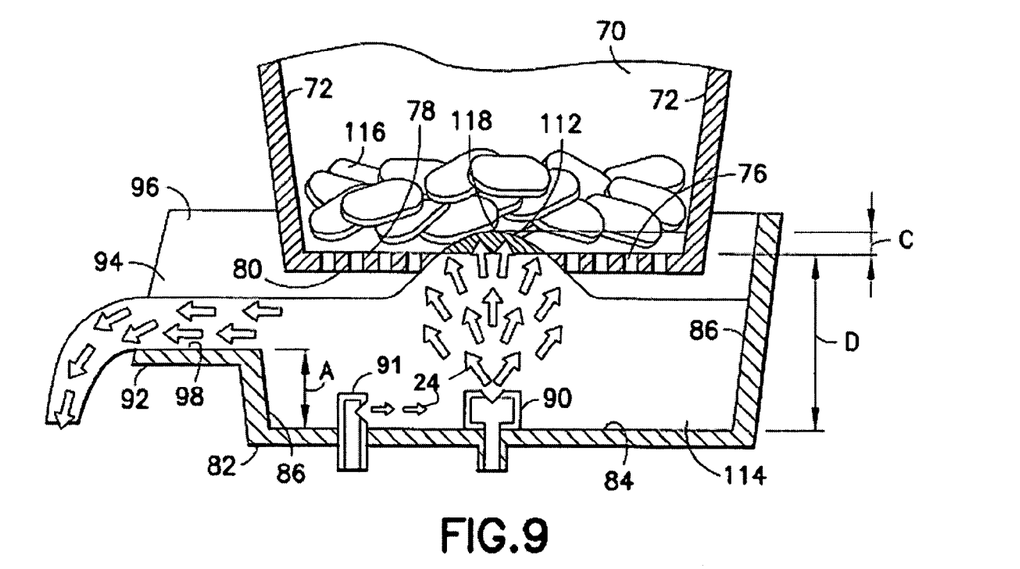
FIG. 9 is a schematic cross-section of the dissolving cup of FIGS. 6–8 showing water flowing into the dissolving cup and a resulting raised-center wave portion.

Referring now to FIG. 5, which illustrates the internal configuration of one embodiment of feeder device 20 of the present invention, a funnel-like hopper 70 having sidewalls 72 and an open bottom 74 forms the inside of top portion 42. A grid 76 at least partially closes open bottom 74 of hopper 70. Grid 76 includes a top surface 78 and a bottom surface 80. One or more chemicals such as calcium hypochlorite are contained within sidewalls 72 of hopper 70 and supported by top surface 78 of grid 76. A dissolving cup 82, which is also illustrated in FIGS. 6–8, is positioned within bottom portion 44 adjacent seam 60. Dissolving cup 82 includes a bottom surface 84 joined with sidewalls 86. Sidewalls 86 extend upwardly above top surface 78 of grid 76 thereby at least partially containing a portion of hopper 70 adjacent seam 60 and grid 76. Sidewalls 86 include an opening or notch 88 formed therein. Opening 88 typically has a predetermined cross-sectional area. Bottom surface 84 includes a center nozzle 90 in fluid communication with inlet 28 and oriented vertically toward bottom surface 80 of grid 76 and an off-center nozzle 91 in fluid communication with inlet 28 and adapted to direct the fluid horizontally in dissolving cup 82. In one embodiment, the flow rate of the fluid flowing through center nozzle 90 is approximately the same as the flow rate flowing through off-center nozzle 91. In other embodiments, the flow rates of fluids flowing into nozzles 90 and 91 may not be the same. A spout 92 is typically fluidly connected with opening 88 and may be integrally formed as part of dissolving cup 82. As best illustrated in FIGS. 6–8, spout 92 is defined by a horizontal channel 94 having channel walls 96 and a channel floor 98. As best illustrated in FIG. 9, channel floor 98 is typically positioned a predetermined distance A above bottom surface 84 of dissolving cup 82. Referring again to FIG. 5, an outlet chamber 100 is define in bottom portion 44 of housing 40 and is in fluid communication with both spout 92 and outlet 30. To prevent scaling or build-up of solids on the inside of outlet chamber 100, the outlet chamber typically includes substantially vertical sidewalls 102.

Still referring to FIG. 5, in one embodiment, bottom portion 44 of feeder device 20 includes an emergency shutoff valve assembly 104 fluidly connected with both a conduit 106, e.g., a plastic tube or pipe, and inlet 28. Conduit 106 is fluidly connected with both center nozzle 90 and off-center nozzle 91. Bottom portion 44 also includes a discharge float assembly 108 operably connected with a discharge and backflow valve assembly 110, which is fluidly connected with outlet 30.

As indicated by the arrows in FIG. 5, in operation, water 24 from pool 26 enters feeder device 20 through inlet 28 via emergency shutoff valve assembly 104. If the flow rate of water 24 flowing through inlet 28 is greater than the flow rate of the water flowing through outlet 30, emergency shutoff valve assembly 104 prevents any additional water from entering feeder device 20 through the inlet. Water 24 then flows from emergency shutoff valve assembly 104 through conduit 106 to both center nozzle 90 and off-center nozzle 91 and into dissolving cup 82. As illustrated in FIG. 9, water 24 flowing into dissolving cup 82 from center nozzle 90 generates a raised-center wave portion 112 within fluid 114 contained by dissolving cup 82. Raised-center wave portion 112 contacts one or more chemicals 116 in hopper 70 thereby causing the one or more chemicals to dissolve into the fluid. One or more chemicals 116 typically include a chlorine compound. Water from off-center nozzle 91 is directed horizontally into fluid 114 to help ensure thorough mixing within the fluid thereby reducing the amount of solids build-up in dissolving cup 82. Once the level of fluid 114 rises to opening 88 in sidewall 86, the fluid flows into horizontal channel 94 defined within spout 92. Spout 92 directs fluid 114 to outlet chamber 100. As the level of fluid in outlet chamber 100 rises, discharge float assembly 108 rises thereby opening the discharge valve (not shown) of discharge and backflow valve assembly 110. Discharge and backflow valve assembly 110 typically also includes a backflow valve (not shown) such as a ball check valve to prevent fluids from backflowing into outlet chamber 100. From outlet chamber 100, fluid 114 is discharged through outlet 30 to pool 26 using pump 36 or a venturi system (not shown) via pool return conduit 34 of recirculation system 22.

Figure 10:
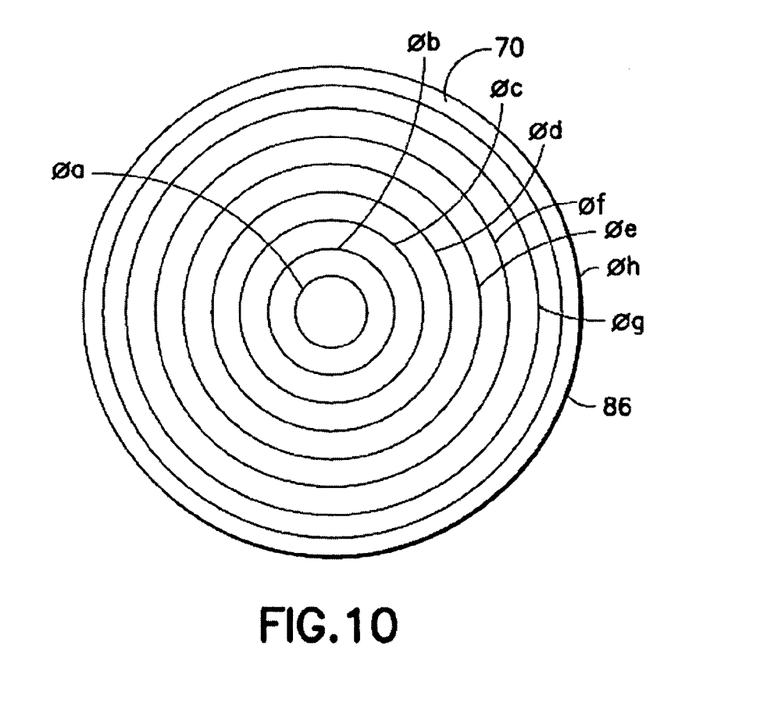
FIG. 10 is a top view of the dissolving cup of FIG. 9, showing various diameters of the portion of the raised-center wave portion that rises above the bottom surface of the grid to contact the one or more chemicals supported by the grid.

Referring now to FIGS. 9 and 10, the amount of one or more chemicals 116 that are dissolved by water 24 and thus the concentration of chlorine or other chemicals in fluid 114 depends on a portion 118 of raised-center wave portion 112 that rises above top surface 78 of grid 76 thereby contacting the one or more chemicals. Portion 118 has a diameter B and a height C. The amount of one or more chemicals 116 that dissolves in water 24 and thus the concentration of chlorine or other chemicals in fluid 114 increases as diameter B and height C increase.

Several factors including the volume of dissolving cup 82, the cross-sectional area of opening 88, a distance D measured from top surface 78 to bottom surface 84, and the flow rate into the dissolving cup, i.e., the inlet flow rate, impact the size of diameter B and height C. Of those factors, the volume of dissolving cup 82 and distance D from top surface 78 to bottom surface 84 are typically set during manufacturing and are therefore constant or not variable for a specific feeder device 20. In a first embodiment, the volume of dissolving cup 82 is approximately 35–40 cubic inches and distance D from top surface 78 to bottom surface 84 is about 1–1.5 inches. The cross-sectional area of opening 88 is also typically set during manufacturing based on an anticipated inlet flowrate. For the first embodiment, the cross-sectional area of opening 88 is typically 1 square inch for every 1 gallon per minute (gpm) of inlet flowrate. Thus, for a 1 gpm inlet flowrate, the cross-sectional area of opening 88 is 1 square inch. As a result, during use, the amount of one or more chemicals 116 that are dissolved by water 24 and thus the concentration of chlorine or other chemicals in fluid 114 may be controlled by varying only the inlet flow rate.

As illustrated in FIG. 10, for the first embodiment, the inlet flow rate typically ranges from 0.2 to 1.05 gpm depending on the desired diameter B of portion 118. The following table provides the inlet flow rates and resulting diameters a through h of portion 118:

|   | Inlet Flow Rate (gpm) | Diameter B of Portion 118 (inches) |
| --- | --- | --- |
| a | 0.3 | 0.625 |
| b | 0.4 | 1.0 |
| c | 0.5 | 1.25 |
| d | 0.6 | 1.45 |
| e | 0.7 | 1.75 |
| f | 0.8 | 2.25 |
| g | 0.9 | 2.5 |
| h | 1.0 | 2.75 |

In use, as inlet flow rate varies, diameter B and height C automatically vary thereby increasing or decreasing the amount of one or more chemicals 116 that are dissolved into fluid 114.

Feeder device 20 of the present invention offers advantages over prior art devices in that it is not pressurized. As a result, manufacturing tolerances are more relaxed thereby decreasing the cost and increasing the overall quality of the devices.

Feeder device 20 of the present invention has a simplified mechanism for increasing the chemical contact with water as the flow increases. Opening 88 of spout 92 is set to create a desired rise in the water level inside dissolving cup 82 to meet desired output range targets. This provides the ability to contact a wide volume range of chemical which gives the ability to vary the concentration of chemicals in fluid 114 substantially. The ability to contact a portion of the chemicals on grid 76 gives feeder device 20 the low end concentration range. At some point, as the flow increases, typically about 0.5 gpm, top surface 78 of grid 76 is entirely covered and the level continues to rise in dissolving cup 82 and begins to rise in hopper 70. The larger volume of chemicals contacted in hopper 70 yields the high end of the concentration range.

The use of off-center, horizontally oriented, nozzle 91 in dissolving cup 82 to stir the insolubles and keep them in suspension so they flow with fluid 114 into bottom portion 44 of feeder device 20 and do not stay in the dissolving cup is another benefit of the feeder device of the present invention.

Feeder device 20 is also designed to prevent build-up of chemicals on sidewalls 102 of bottom portion 44. Bottom portion 44 and outlet chamber 100 include steep sidewalls 102 to prevent the collection of chemical residue in the bottom portion.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A feeder device for introducing one or more chemicals to a fluid comprising:
    a housing having an inlet through which the fluid flows into the feeder device at an inlet flow rate and an outlet through which the fluid flows out of the feeder device at an outlet flow rate;
    a hopper having sidewalls and at least an open bottom, said hopper defining a top portion of said housing;
    a grid at least partially closing said open bottom, said grid having a top surface and a bottom surface, said grid and said hopper adapted to hold the one or more chemicals so that the one or more chemicals are supported by said top surface and are contained by said hopper sidewalls;
    a dissolving cup at least partially containing said hopper and said bottom surface of said grid, said dissolving cup having a bottom surface and sidewalls joined thereto, said sidewalls extending upwardly above said top surface of said grid, said bottom surface including a center nozzle in fluid communication with said inlet and oriented vertically toward said grid, said bottom surface positioned a predetermined distance from said top surface of said grid, said sidewalls having an opening formed therein, said opening having a predetermined cross-sectional area;
    a spout fluidly connected with said opening, said spout defining a horizontal channel having channel walls and a channel floor, said channel floor positioned a predetermined distance above said bottom surface of said dissolving cup; and
    an outlet chamber in fluid communication with said spout and said outlet, said outlet chamber defining a bottom portion of said housing.

2. A feeder device according to claim 1, wherein said dissolving cup is adapted to at least temporarily contain the fluid and said inlet flow rate is selected so as to create a raised-center wave portion within the fluid contained by said dissolving cup.

3. A feeder device according to claim 2, wherein a portion of said raised-center wave portion enters said hopper at least at said top surface of said grid, said portion of said raised-center wave portion defined by a circular cross-sectional area and a height, said circular cross-sectional area having a diameter, said diameter and said height both varying according to said inlet flow rate.

4. A feeder device according to claim 1, wherein said bottom surface includes an off-center nozzle in fluid communication with said inlet and adapted to direct the fluid horizontally in said dissolving cup.

5. A feeder device according to claim 1, wherein said outlet chamber includes substantially vertical sidewalls.

6. A feeder device according to claim 1, wherein the device is not pressurized.

7. A feeder device according to claim 3, wherein when said inlet flow rate is about 0.3 gallons per minute, said diameter is about 0.625 inch.

8. A feeder device according to claim 3, wherein when said inlet flow rate is about 0.4 gallons per minute, said diameter is about 1.0 inch.

9. A feeder device according to claim 3, wherein when said inlet flow rate is about 0.5 gallons per minute, said diameter is about 1.25 inches.

10. A feeder device according to claim 3, wherein when said inlet flow rate is about 0.6 gallons per minute, said diameter is about 1.45 inches.

11. A feeder device according to claim 3, wherein when said inlet flow rate is about 0.7 gallons per minute, said diameter is about 1.75 inches.

12. A feeder device according to claim 3, wherein when said inlet flow rate is about 0.8 gallons per minute, said diameter is about 2.25 inches.

13. A feeder device according to claim 3, wherein when said inlet flow rate is about 0.9 gallons per minute, said diameter is about 2.5 inches.

14. A feeder device according to claim 3, wherein when said inlet flow rate is about 1.0 gallons per minute, said diameter is about 2.75 inches.

15. A feeder device according to claim 1, further comprising means for varying the amount of the one or more chemicals contacted by the fluid.

16. A feeder device according to claim 1, further comprising means for temporarily containing the fluid and creating a raised-center wave portion within the fluid, wherein said raised-center wave portion enters a portion of said hopper at least at said top surface of said grid, said portion of said hopper defined by a circular cross-sectional area and a height, said circular cross-sectional area having a diameter.

17. A feeder device according to claim 16, further comprising means for varying said circular cross-sectional area and said height according to said inlet flow rate.

18. A feeder device according to claim 1, further comprising means for mixing the fluid and the one or more chemicals within said dissolving cup.

19. A feeder device according to claim 1, further comprising means for preventing the one or more chemicals from attaching to said outlet chamber.

20. A method of introducing one or more chemicals to a fluid comprising the steps of:
    providing a feeder device according to claim 1;
    introducing fluid to the feeder device at an inlet flow rate;
    bringing a portion of the fluid in contact with a portion of the one or more chemicals, said portion of the fluid defined by a circular cross-sectional area and a height, said circular cross-sectional area having a diameter; and
    varying said diameter and said height according to said inlet flow rate.

21. A method according to claim 20, further comprising the step of mixing the fluid and the one or more chemicals.

22. A feeder device for introducing one or more chemicals to a fluid comprising:
    a housing having an inlet through which the fluid flows into the feeder device at an inlet flow rate and an outlet through which the fluid flows out of the feeder device at an outlet flow rate;
    a hopper having sidewalls and at least an open bottom, said hopper defining a top portion of said housing;
    a grid at least partially closing said open bottom, said grid having a top surface and a bottom surface, said grid and said hopper adapted to hold the one or more chemicals so that the one or more chemicals are supported by said top surface and are contained by said hopper sidewalls;

a dissolving cup at least partially containing said hopper and said bottom surface of said grid, said dissolving cup having a bottom surface and sidewalls joined thereto, said sidewalls extending upwardly above said top surface of said grid, said bottom surface including a center nozzle in fluid communication with said inlet and oriented vertically toward said grid, said bottom surface positioned a predetermined distance from said top surface of said grid, said sidewalls having an opening formed therein, said opening having a predetermined cross-sectional area, wherein said dissolving cup is adapted to at least temporarily contain the fluid and said inlet flow rate is selected so as to create a raised-center wave portion within the fluid contained by said dissolving cup, a portion of said raised-center wave portion entering a said hopper at least at said top surface of said grid, said portion of said raised-center wave portion being defined by a circular cross-sectional area and a height, said circular cross-sectional area having a diameter, said diameter and said height both varying according to said inlet flow rate;

a spout fluidly connected with said opening, said spout defining a horizontal channel having channel walls and a channel floor, said channel floor positioned a predetermined distance above said bottom surface of said dissolving cup; and an outlet chamber joined with said hopper and in fluid communication with said spout and said outlet, said outlet chamber defining a bottom portion of said housing.

* * * * *